United States Patent
Foster et al.

(10) Patent No.: US 6,832,358 B2
(45) Date of Patent: Dec. 14, 2004

(54) SYSTEM AND METHOD FOR PROVIDING BURST LICENSING IN A CIRCUIT SIMULATION ENVIRONMENT

(75) Inventors: Paul C. Foster, Scotts Valley, CA (US); James Britton, San Jose, CA (US); Alan Mayes, Fareham (GB); Richard E. Seiter, Santa Cruz, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 10/322,854

(22) Filed: Dec. 18, 2002

(65) Prior Publication Data

US 2004/0019566 A1 Jan. 29, 2004

Related U.S. Application Data

(60) Provisional application No. 60/342,971, filed on Dec. 19, 2001.

(51) Int. Cl.[7] .............................................. G06F 17/50
(52) U.S. Cl. ..................... 716/4; 716/5; 716/6; 705/59; 705/51; 705/57
(58) Field of Search ............................. 716/4–6, 1, 18; 713/200–201; 705/51, 57, 59; 701/1, 59

(56) References Cited

U.S. PATENT DOCUMENTS

| | | | | | |
|---|---|---|---|---|---|
| 4,924,378 | A | * | 5/1990 | Hershey et al. | ............. 713/201 |
| 5,671,412 | A | * | 9/1997 | Christiano | ............... 707/104.1 |
| 5,745,879 | A | * | 4/1998 | Wyman | ........................... 705/1 |
| 6,304,972 | B1 | * | 10/2001 | Shavit | ........................ 713/200 |
| 6,609,244 | B2 | * | 8/2003 | Kato et al. | ..................... 716/18 |
| 6,668,360 | B1 | * | 12/2003 | Liu | ................................ 716/4 |
| 2002/0161718 | A1 | * | 10/2002 | Coley et al. | .................. 705/59 |
| 2002/0194008 | A1 | * | 12/2002 | Yang et al. | ..................... 705/1 |
| 2003/0182236 | A1 | * | 9/2003 | Tanaka et al. | ................ 705/51 |
| 2003/0185399 | A1 | * | 10/2003 | Ishiguro | ..................... 380/281 |
| 2004/0044509 | A1 | * | 3/2004 | Demler et al. | ................ 703/14 |

OTHER PUBLICATIONS

Wilamowski, B.et al., "SIP–Spice Intranet Package", Industrial Electronics, 1998, Proceedings. ISIE '98. IEEE International Symposium on , vol.: 1, Jul. 7–10, 1998. pp.:192–195 vol. 1.*

* cited by examiner

Primary Examiner—Matthew Smith
Assistant Examiner—Naum Levin
(74) Attorney, Agent, or Firm—Fliesler Meyer LLP

(57) ABSTRACT

A system and method which allows for burst licensing, particularly for use in a circuit design and analysis system in which designers use tools to assist in characterizing and verifying the circuit. Burst licensing is used to provide licenses on an 'as and when required' basis to allow system users or customers to carry out massive parallelism of the simulation tasks when run from selected tools. When the system receives a request to start a task, the system checks-out a burst license for use in processing the task, and assigns the license to a particular CPU. The task is then performed at that CPU, and once completed the burst license is returned to the license pool.

48 Claims, 3 Drawing Sheets

SYSTEM AND METHOD FOR PROVIDING BURST LICENSING IN A CIRCUIT SIMULATION ENVIRONMENT

CLAIM OF PRIORITY

This application claims priority of U.S. Provisional Patent Application entitled "SYSTEM FOR BURST LICENSING," Ser. No. 60/342,971 filed Dec. 19, 2001, and incorporated herein by reference.

This application is related to U.S. Patent Application entitled "SYSTEM FOR ELECTRONIC CIRCUIT CHARACTERIZATION, ANALYSIS, MODELING AND PLAN DEVELOPMENT," Ser. No. 09/965,676 filed Sep. 27, 2001 which is based on provisional application entitled "SYSTEM FOR ELECTRONIC CIRCUIT CHARACTERIZATION, ANALYSIS, MODELING AND PLAN DEVELOPMENT," Application No. 60/235,730, filed Sep. 27, 2000, each of which applications are incorporated herein by reference.

FIELD OF THE INVENTION

The invention relates generally to a system and method for burst licensing, particularly for use in electronic circuit design environments.

BACKGROUND

Circuit level designers typically develop electronic circuits using plans, the most commonly encountered plans being Characterization Plans and Synthesis Plans, which have much in common, although their end purpose is very different. In both cases, designers need tools to assist in characterizing and verifying the circuit (i.e. acquiring characterization results for the circuit through simulation), tools to assist visual and data processing analysis of the characterization results, tools to assist in the creation of behavioral models for a circuit, and tools to provide mechanisms that enable reuse of characterization efforts in the development of plans and for characterization of other designs.

Traditionally these tools have been supplied piecemeal, often by a variety of different manufacturers, which leads to inconsistencies and to much lost time and money as developers learn to master multiple complex systems. In addition, these tools often must be licensed for use by each designer, which greatly increases the cost of providing the tools throughout the corporation. The alternative, of not providing all of the required tools to each designer because of cost constraints, would mean that only certain designers could have access to the tools, and the entire development effort would be hampered.

SUMMARY

A system is herein disclosed which allows for burst licensing, particularly for use in a circuit design and analysis system in which designers use a variety of tools to assist in characterizing and verifying the circuit (i.e. acquiring characterization results for the circuit through simulation). Each tool typically requires its own license to operate. Burst licensing allows tool licenses to be provided on an 'as and when required' basis, so as to allow system users or customers to carry out massive parallelism of the simulation tasks when run from selected tools.

By implementing a complex handshake between the simulator and the tool, the system can ensure that individual stand-alone simulation users do not get the benefit of burst licensing. As such, the burst licensing feature can be reserved for those users who have many simulations to run, for example during characterization or optimization processes.

One embodiment of the invention is particularly useful in environments that include either a circuit simulator (such as the Antrim AMS simulator, or the Antrim OmniSim simulator, both developed by Antrim Design Systems, Inc.) and/or a simulation control program (such as Antrim Aptivia, Antrim ACV, or Antrim MSS, also developed by Antrim Design Systems, Inc.). However, it will be evident to one skilled in the art that the features, benefits, and advantages of burst licensing as provided by the invention may be used in a wide variety of other environments and industries, and particularly with other simulation environments, simulation control programs, and simulator tools, in addition to those explicitly mentioned above.

DETAILED DESCRIPTION

Figure 1:
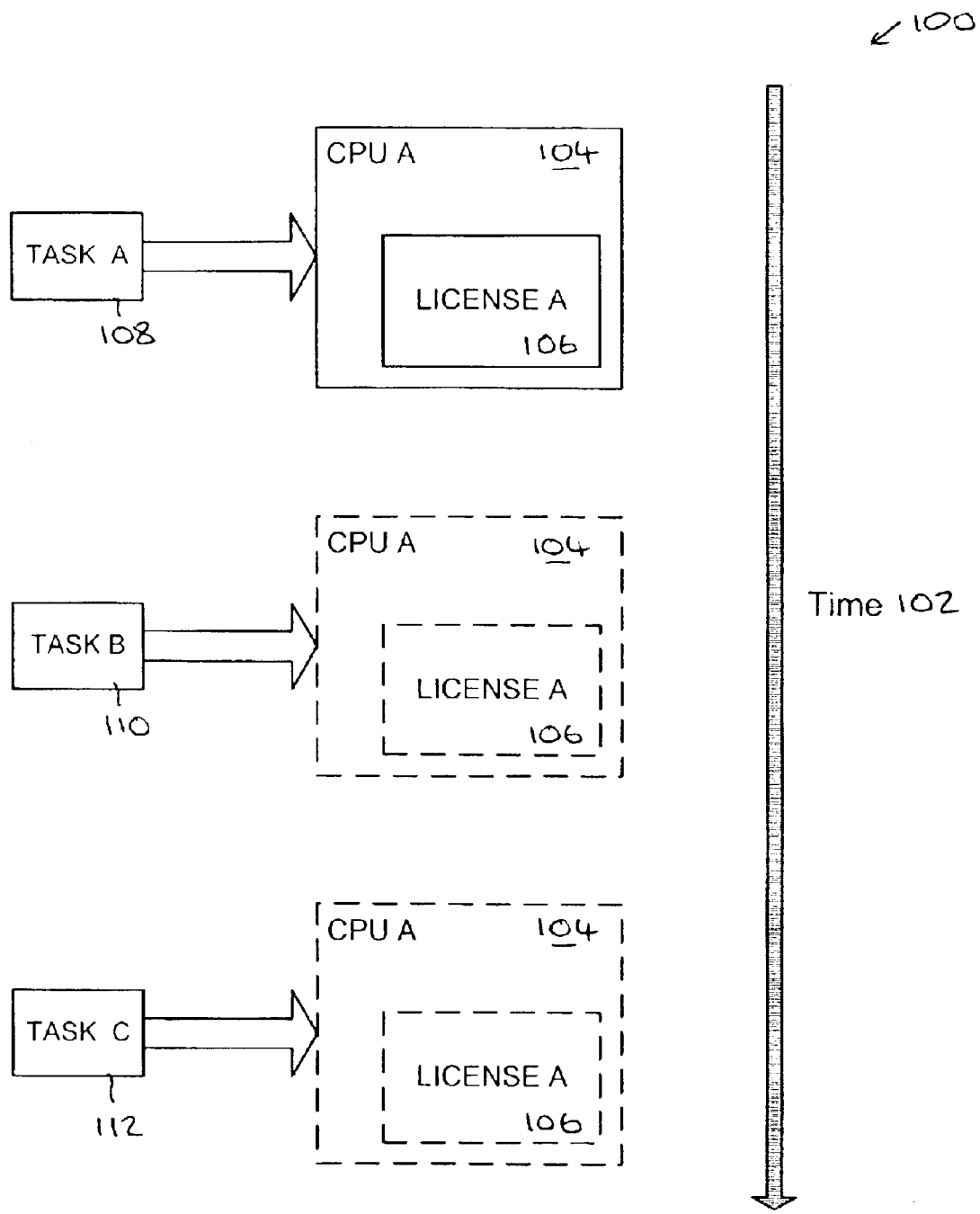
FIG. 1 shows a schematic of a system that utilizes a single CPU-based license for task processing.

A system is herein disclosed which allows for burst licensing, particularly for use in a circuit design and analysis system in which designers use a variety of tools to assist in characterizing and verifying the circuit (i.e. acquiring characterization results for the circuit through simulation). Each tool typically requires its own license to operate. Burst licensing allows tool licenses to be provided on an 'as and when required' basis, so as to allow system users or customers to carry out massive parallelism of the simulation tasks when run from selected tools.

By implementing a complex handshake between the simulator and the tool, the system can ensure that individual stand-alone simulation users do not get the benefit of burst licensing. As such, the burst licensing feature can be reserved for those users who have many simulations to run, for example during characterization or optimization processes.

One embodiment of the invention is particularly useful in environments that include either a circuit simulator (such as the Antrim AMS simulator, or the Antrim OmniSim simulator, from Antrim Design Systems, Inc.) and/or a simulation control program (such as Antrim Aptivia, Antrim ACV, or Antrim MSS, also from Antrim Design Systems, Inc.). However, it will be evident to one skilled in the art that the features, benefits, and advantages of burst licensing as provided by the invention may be used in a wide variety of other environments and industries, and particularly with other simulation environments, simulation control programs, and simulator tools, in addition to those explicitly mentioned above. Features provided by the invention include:

Ability to provide simulation job load balancing using dynamic job and machine speed evaluation.

Handshaking between the simulation environment (e.g. ACV and the simulator AMS) can be used to grant the burst license. In one embodiment, burst licensing is only supported or provided for non-interactive use of the system, e.g. for non-interactive characterization and verification. This feature can be used to prevent individual or interactive users from accessing the burst licenses.

Simulations can be performed faster, and in parallel, without increasing the need for additional licenses: for example 10 load values*10 supply voltages*10 temperatures*3 processes for 1 design=3000 simulations.

The elapsed task processing time is can be divided by the number of available machines.

The system allows all available resources to be focused on the job at hand.

A network of machines can be treated as a single controlled resource to get the job done most expediently.

Allows mixed system architectures to be used concurrently.

Burst licenses provide enormous throughput when needed.

Burst licensing allows many more simulation conditions to be run in a shorter time than would normally be possible. This results in more accurate, and more complete information, yielded in a shorter time.

The availability of burst licensing and the resultant faster simulation time allows design problems to be found during verification before tape out, thus providing considerable savings, both in terms of the time and costs of design re-spins.

Burst Licensing

When creating a new circuit design, the circuit designer (i.e. the "user") will often have a "set of simulation tasks" that they want to accomplish on a given design. An example of such a set might be:

Characterizing a design across a set of process corners.

Characterizing a design over a range of power supply variations.

Characterizing or optimizing a design with multiple minor design changes.

Performing a group of analyses on a design e.g. (DC analysis, AC analysis, Transient analysis).

A key point to note here is that the user is typically working with a single design and is performing a related set of analysis tasks to the design. Without using a technique such as burst licensing ("Burst") the user has basically two options for accomplishing the set of simulation tasks:

1. Use a single license and run the tasks sequentially on a single central processing unit (CPU); or,
2. Purchase multiple licenses and run the jobs in parallel on multiple CPU's.

FIG. 1 shows a schematic of a system that utilizes a single CPU-based license for task processing, i.e. it adheres to option 1 above. As shown in FIG. 1, the system 100 is illustrated with time 102 progressing down the page. The single CPU A 104 shown includes a single CPU-based License A 106. As tasks arrive to be processed, including Task A 108, they are handed off to CPU A 104, and processed. The next Task B 110 arrives and is similarly processed. Task C 112 is then processed, and so on. Each task is processed sequentially and in order by the CPU.

Figure 2:
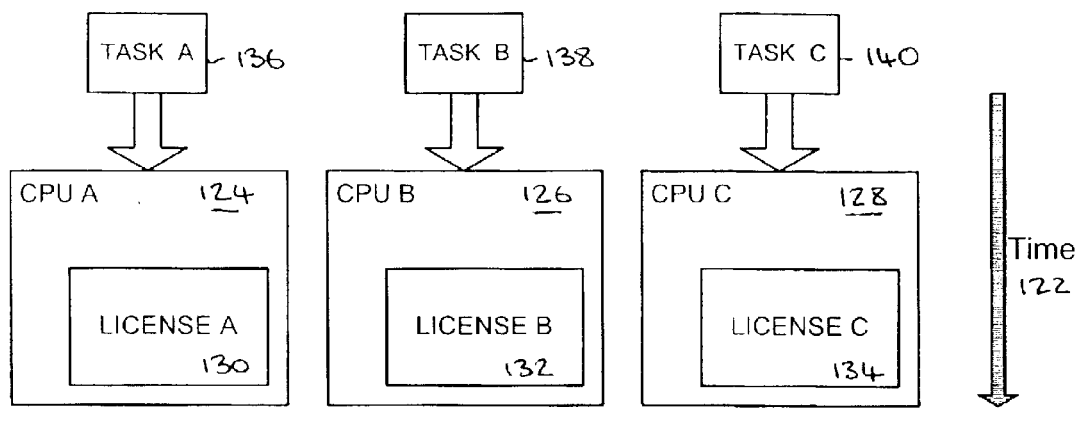
FIG. 2 shows a schematic of a system that utilizes multiple CPU's and multiple licenses for task processing.

FIG. 2 shows a schematic of a system that utilizes multiple CPU's and multiple licenses for task processing, i.e. it adheres to option 2 above. As shown in FIG. 2, the system 120 is illustrated, again with time 122 progressing down the page. This time multiple CPU's are shown, including CPU A 124, CPU B 126, and CPU C 128. Each CPU includes its own CPU-based license, including License A 130, License B 132, and License C 134. As tasks arrive to be processed, including task A 136, task B 138, and Task C 140, the tasks can be handed to the plurality of CPU's to be processed in parallel, and thus in a shorter period of time.

(Although FIG. 2 shows only three CPU's it will be evident that the system therein can be extended to many more CPU's, with the proviso that each CPU include it's own license for the tool handling the task. Some systems may also use a combination of the option 1 shown in FIG. 1, and option 2 shown in FIG. 2, to create a hybrid system).

It should be clear from examination of FIG. 1 and FIG. 2 that, while option 1 requires fewer licenses, the total time for processing all tasks is greater, since only one job or task runs at a time. Option 2 performs much faster, but requires the purchase of all of the required software license, and is consequentially a much more expensive option.

The primary idea behind burst licensing ("Burst"), as embodied in the present invention, is to equip the system with a mechanism for providing the user with an inexpensive software license that can be used to accomplish a "set of simulation tasks" rapidly through parallel execution on multiple CPUs. Burst licensing is typically restricted to non-interactive use, and typically cannot be used to run general unrelated simulation tasks in parallel. Instead, burst licensing is reserved for those tasks, such as characterizing and verifying a circuit, that require multiple simulation runs and tasks.

Burst Licensing Architecture

Figure 3:
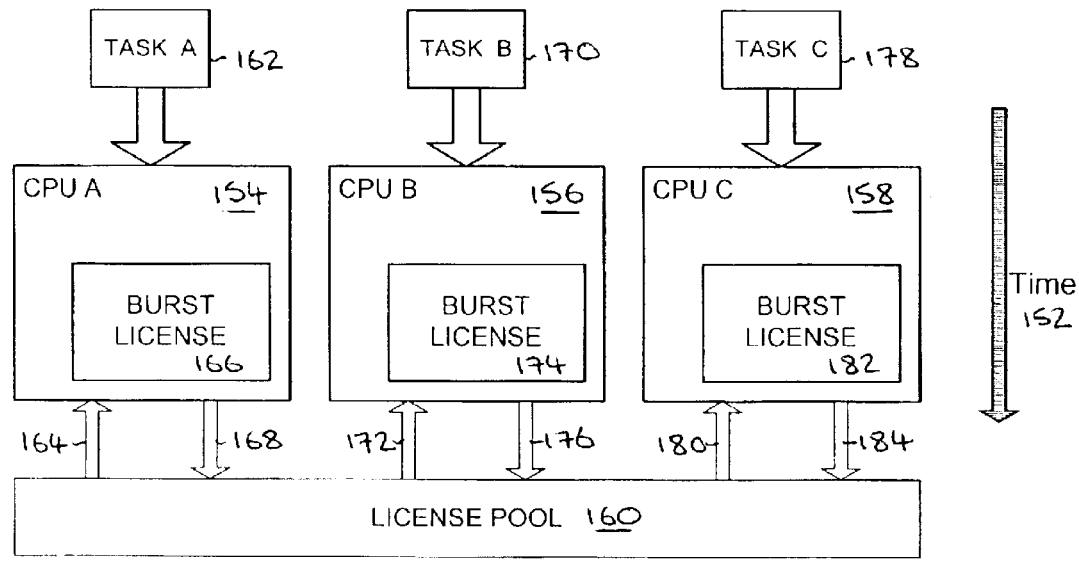
FIG. 3 shows a schematic of a system that utilizes multiple CPU's and burst-licensing for task processing, in accordance with an embodiment of the invention.

FIG. 3 shows a schematic of a system that utilizes multiple CPU's and burst-licensing for task processing, in accordance with an embodiment of the invention. As shown in FIG. 3, the system 150, together with time 152 progressing vertically down the page. resembles option 2 above in that multiple CPU's are shown, including CPU A 154, CPU B 156, and CPU C 158. However, when burst licensing is used each CPU does not need to include its own CPU-based license. Instead, all available licenses are grouped in a license pool 160. When a task arrives to be processed, including for example task A 162, a burst license 166 is used ("checked-out" 164) from the license pool and temporarily provided to the CPU (in this case CPU A 154) where it is used to run the task. The burst license can then be returned ("checked-in" 168) to the license pool for another job to use. The system can similarly handle Task B 170 by checking-out a burst license 174 from the license pool and temporarily providing it 172 to, in this case CPU B 156, then returning it 176. The system can similarly handle Task C 178 by checking-out 180 a burst license 182 from the license pool and temporarily providing it to, for example CPU C 158 to process the task, prior to returning it 184.

In short, whenever a task needs to be run, the system determines if a burst license is available in the license pool, and if it is available, checks it out and temporarily assigns it to a CPU to run the task. Each of the burst license within a particular group may be considered identical for the purposes of running that task, and a burst license can be issued to any CPU-task pair. If enough burst licenses are provided, then many tasks can be performed in parallel, without requiring a separate licenses to be purchased for each tool and for each CPU. In this way a system such as that shown in FIG. 3 that implements burst licensing combines the benefits both of lower-cost licensing through the organization, and high simulation task throughput.

Figure 4:
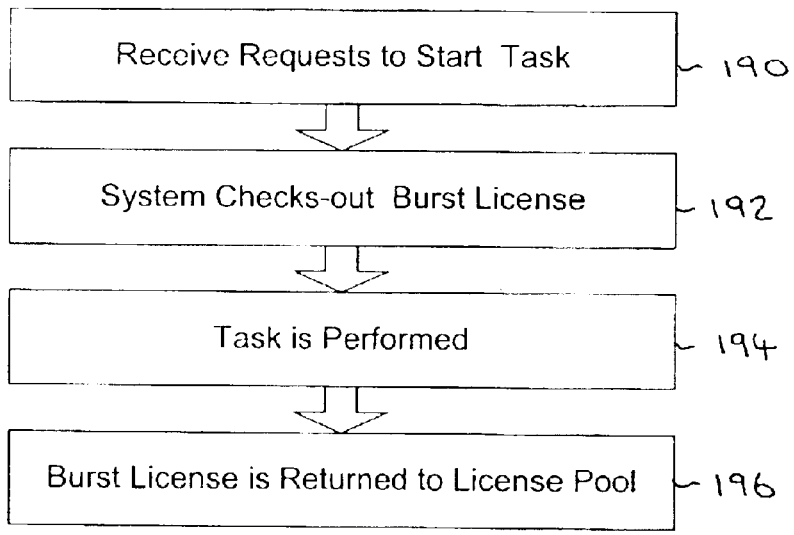
FIG. 4 shows a flowchart of a burst licensing process in accordance with an embodiment of the invention.

FIG. 4 shows a flowchart of a burst licensing process in accordance with an embodiment of the invention. As shown in FIG. 4, in step 190 the system receive a request to start a task, or multiple or tasks. In step 192, the system checks-out a burst license for use in processing the task, and assigns the license to a particular CPU. In step 194 the task is performed at that CPU, and in step 196, once the task is completed the burst license is returned to the license pool.

Figure 5:
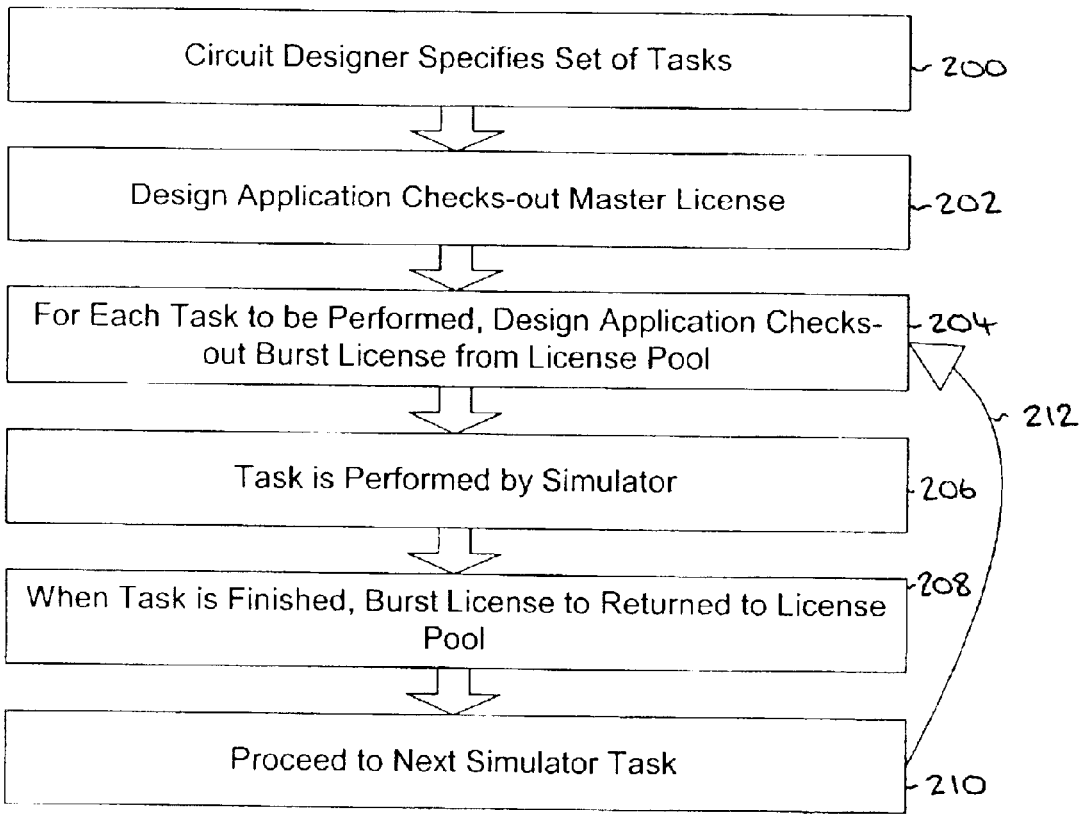
FIG. 5 shows a flowchart of a burst licensing process as it may be used with a circuit design simulator in accordance with an embodiment of the invention.

FIG. 5 shows a flowchart of a burst licensing process as it may be used with a circuit design simulator in accordance with an embodiment of the invention. As shown in FIG. 5, in step 200, the circuit designer specifies a set of tasks to be performed, typically non-interactive tasks such as characterization and verification. In step 202, the design application checks-out a master license to begin the set of tasks. In step 204, for each task to be performed, the design application checks-out a burst license from the license pool that corresponds to the tool required to perform the task. In step 206 the task is performed by the simulator using the necessary, and now properly licensed tool. In step 208, when the task is finished, the burst license is returned to the license pool, and in step 210 the system proceeds to handle the next simulator task. The entire checking-in and checking-out process is repeated as necessary (step 212).

Example Burst Licensing Implementation

The following sections describe a burst licensing implementation in a circuit design software implementation which includes a simulation environment or control program (such as Antrim Aptivia, Antrim ACV, or Antrim MSS), and a circuit simulator (such as Antrim AMS, or Antrim OmniSim). It will be evident that other simulation environments or simulators could be equally used and could employ burst licensing in the manner decribed herein. Burst licensing may also be employed for use with other applications, and within other industries, in addition to circuit design. While the implementations described below are given for purposes of illustration, they are not intended to be exhaustive or to limit the invention to the precise forms disclosed. Many modifications and variations will be apparent to practitioners skilled in the art, while remaining within the spirit and scope of the invention.

In one embodiment, burst licensing is deployed by selling licenses in sets. Each user will typically require a single "master license" to be able to use the system. To then run each of his/her tasks, the system draws burst licenses from a pool of burst licenses that are shared by many users. Typically a burst license may be priced at ½ to ¼ of the cost of a master license and users will typically buy two to four times as many burst licenses as master licenses. The number and type of master and burst licenses can be varied to suit the particular needs of the organization. For example, in one implementation that uses AMS, the system recognizes two forms of "master" licenses, AMSTIED and AMSFULL, and one form of burst license, AMSBURST.

In one embodiment, the burst licensing scheme can be implemented through two software programs and multiple sets of software licenses. These two programs may be a simulator (for example Antrim AMS, Antrim OmniSim, or another type of simulator) and a simulation control program (for example either Antrim ACV, Antrim MSS, Antrim Aptivia, or another type of simulation environment). In this embodiment, the user specifies the jobs to be run in the simulation control program. In ACV, for example, the user is allowed to specify a set of corners or sweeps that are to be performed on his design, and a set of tests to be run on the design to verify correct operation. In MSS the user can specify a set of components in a design which are to have their values altered, and a set of tests to be run on the design to verify correct operation. The simulation environment (i.e. either ACV or MSS) then takes care of checking out any necessary licenses, and distributing the tasks in the set over a group of CPUs. When the user starts his first job from a set of tasks, the simulation environment checks out a "master" license. When the environment begins subsequent tasks from the set, then it checks out burst licenses. If the simulation is successful in checking out the licenses (i.e. there are enough unused licenses available), then the simulator (for example AMS) is started and the data for the simulation task is passed to AMS.

Using this methodology, the simulator (i.e. AMS) effectively never checks out a license if it is being run from within the simulation environment (i.e. from within ACV or MSS). Since ACV and MSS by construction force the user to run jobs from sets, the approach works.

Example Burst Licensing Plan
1. As will be evident, there can be many licensing schemes, including, for example:
   A scheme based on point tools and targeted at large companies.
   A scheme which is seat-based and targeted at smaller customers who need a limited number or copies of the products.
2. There may also be various types of licenses with varying prices, for example:

| License Type | Price | Description |
| --- | --- | --- |
| ACVCORE | 15 | Standard ACV |
| MSSCORE | 17 | Standard MSS license |
| AMSCORE | Free | Free license |
| AMSFULL | 35 | Full floating AMS license |
| AMSTIED | 16 | AMS license tied to ACV |
| AMSBURST | 12 | AMS burst license |
| AMSVLOG | 10 | AMS verilog D license |
| AMSRELAX | 18 | AMS license for relaxation |

(The prices given above are merely exemplary and do not necessarily reflect actual prices. It will be evident to one skilled in the art that these license types, descriptions, and price values are given merely for purposes of illustrating the uses and benefits of the invention, and that the invention is not limited to the particular types of licenses, applications, or scenarios shown or described in this disclosure).

3. A seat based model may use ACVCORE and AMSTIED licenses

4. A point tool based model may use ACVCORE and AMSFULL licenses.

5. Burst licensing is only useful when performing multiple runs of the same type. The developer must always check-out one of the more expensive ACVFULL or ACVTIED licenses first.

6. In order to use AMS from the command line or with AAI or ACI (without ACV) the customer must purchase AMSFULL licenses.

Example Burst Licensing Implementation for ACV

The following section describes a particular implementation of burst licensing as it may be used to provide burst licensing in an Antrim ACV environment. This part of the description is given for illustrative purposes, and is not intended to limit the invention to the particular implementation described. As discussed above, it will be evident that burst licensing can be used in other implementations and with other systems beyond those described, within the spirit and scope of the invention.

1. When the user starts up ACV, ACV checks out an ACVCORE. If this fails then ACV aborts.

2. When it comes time to run a simulation ACV first tries to check out an AMSTIED. If this fails ACV tries to check out an ACVFULL. If this fails ACV gives an error message telling the user to try again later or check the licensing system. If the check-outs succeed then ACV starts AMS passing it the correct burst token.

3. If the user is running multiple simulations in a sweep, or corner loop, then the first simulation follows (2) above. For subsequent simulations ACV first tries to check-out AMSBURST licenses. If this fails ACV tries to check-out AMSFULL. If this succeeds ACV starts AMS passing it the burst token.

4. When AMS is started it always checks out an AMSCORE license. This is done to make it more difficult for a user to defeat the burst system and, for example, obtain unlimited free AMS usage. The number of AMSCORE licensees provided is: AMSCORE=AMSFULL+ AMSTIED+AMSBURST.

5. If AMS is does not receive the burst key (as when being run from the command line, AMS checks out an AMSFULL license).

6. If AMS detects that the user is using one of the advanced features (Relax, Verilog-D, etc) then it checks out the appropriate AMSVLOG or AMSRELAX licenses. Typically the number of AMSVLOG licenses should be the same as the number of AMSCORE.

7. MSS operates in the same way as ACV, only it checks out an MSSCORE license on start up.

Example Burst License Packaging and Sale Model

1. Site license model: In this case there are always equal number of AMSTIED and ACVCORE licenses sold. Additional burst and AMSVLOG licenses can be added as needed. A typical package might for example include the following licenses:

| | |
|---|---|
| 1ea. | ACVCORE |
| 1ea | AMSTIED |
| 2ea | AMSBURST |
| 3ea | AMSCORE |
| 3ea | AMSVLOG |
| 3ea | AMSRELAX |

The above package would allow one user at a time to use the software, but he/she could run up to 3 simulations in parallel using burst licensing.

2. Point tool model. To gain any advantage from this model the user must either want to run AMS directly from the command line or he/she must purchase more ACV licenses than AMS licenses (otherwise it is cheaper to just buy the locked packages). A typical package might for example include the following licenses:

| | |
|---|---|
| 10ea | ACVCORE |
| 5ea | AMSFULL |
| 10ea | AMSBURST |
| 15ea | AMSCORE |
| 15ea | AMSVLOG |
| 15ea | AMSRELAX |

The above package would allow 10 users at a time to use the products, but a maximum of five of them could be actively running simulations. The assumption here is that half of the users are actively simulating while the other half are busy in ACV setting up their jobs or looking at the results of simulations done earlier. Each of the 5 simulation users can run up to 3 simulations in parallel using burst licensing.

The foregoing description of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. In particular, it will be evident that other simulation environment or control programs (such as Antrim Aptivia, Antrim ACV, Antrim MSS, or an other type of simluation environment), and other circuit simulators (such as Antrim AMS, or Antrim OmniSim, or another type of circuit simulator) could be used. It will also be evident that burst licensing may also be employed for use with other applications and with other industries in addition to circuit design. While the implementations described above are given for purposes of illustration, they are not intended to be exhaustive or to limit the invention to the precise forms disclosed. It is intended that the scope of the invention be defined by the following claims and their equivalents.

What is claimed is:

1. A system for burst licensing of simulation tools in a circuit design and simulation environment, comprising:

means for specifying within a license pool a plurality of burst licenses for use by any of a plurality of processors in performing simulation tasks, wherein a burst license licenses a processor to perform a particular task;

means for allowing a user to submit a set of tasks to be performed with or upon a circuit design;

means for temporarily checking-out from said license pool one or more of said burst licenses, and assigning said burst licenses to a matching number of processors for the duration of performing a task at that processor; and means for processing said set of tasks in parallel across the plurality of processors currently having assigned burst licenses.

2. The system of claim 1 wherein the system includes a plurality of processors greater in number than the number of licenses in the license pool.

3. The system of claim 1 wherein the tasks can be distributed over the plurality of processors and performed in parallel.

4. The system of claim 1, wherein the system can be incorporated into a circuit simulation environment.

5. The system of claim 4 wherein the tasks are simulation tasks to be performed on a circuit design.

6. The system of claim 5 wherein the tasks are one of characterization and verification tasks.

7. The system of claim 1 wherein the tasks are received from a user system.

8. The system of claim 7 further comprising a means for handshaking between the user's system and the system to prevent interactive use of the license pool.

9. A system for burst licensing of simulation tools in a circuit design and simulation environment, comprising:

a license pool including burst licenses for use in performing simulation tasks, wherein a burst license licenses a processor to perform a particular task;

a plurality of processors for performing tasks;

a set of tasks submitted by a user to be performed with or upon a circuit design; and wherein, in response to receiving a request to perform a set of tasks, the system temporarily checks-out from said license pool one or more of said burst licenser, and assigns one or more licenses from the license pool to a matching number of processors, to allow those processors to perform the set of tasks in parallel.

10. The system of claim 9 wherein the system includes a plurality of processors greater in number than the number of licenses in the license pool.

11. The system of claim 9 wherein the tasks can be distributed over the plurality of processors and performed in parallel.

12. The system of claim 9, wherein the system can be incorporated into a circuit simulation environment.

13. The system of claim 12 wherein the tasks are simulation tasks to be performed on a circuit design.

14. The system of claim 13 wherein the tasks are one of characterization and verification tasks.

15. The system of claim 9 wherein the tasks are received from a user system.

16. The system of claim 15 further composing a handshaking between the user's system and the system to prevent interactive use of the license pool.

17. A method for burst licensing of simulation tools in a circuit design and simulation environment, comprising the steps of:
specifying a pool of burst licenses for use by processors in performing certain simulation tasks, wherein a burst license licenses a processor to perform a particular task;
allowing a user to submit a set of tasks to be performed with or upon a circuit design, and, in response to receiving a request to perform a task, the substeps of
checking-out one or more burst licenses from the pool and assigning said burst licenses to a matching number of processors,
using said burst licenses with said processors to perform the set of tasks in parallel, and,
returning said burst licenses to the pool.

18. The method of claim 17 wherein the system includes a plurality of processors greater in number than the number of licenses in the license pool.

19. The method of claim 17 wherein the tasks can be distributed over the plurality of processors and performed in parallel.

20. The method of claim 17, wherein the system can be incorporated into a circuit simulation environment.

21. The method of claim 20 wherein the tasks are simulation tasks to be performed on a circuit design.

22. The method of claim 21 wherein the tasks are one of characterization and verification tasks.

23. The method of claim 17 wherein the tasks are received from a user system.

24. The method of claim 23 further comprising a means for handshaking between the users system and the system to prevent interactive use of the license pool.

25. A system for burst licensing of simulation tools in a circuit design and simulation environment, including computer-readable instructions thereon, which when executed cause the system to perform the steps of:
specifying a pool of burst licenses for use by processors in performing certain simulation tasks, wherein a burst license licenses a processor to perform a particular task;
allowing a user to submit a set of tasks to be performed with or upon a circuit design, and, in response to receiving a request to perform a task, the substeps of
checking-out one or more burst licenses from the pool and assigning said burst licenses to a matching number of processors,
using said burst licenses with said processors to perform the set of tasks in parallel, and,
returning said burst licenses to the pool.

26. The system of claim 25 wherein the system includes a plurality of processors greater in number than the number of licenses in the license pool.

27. The system of claim 25 wherein the tasks can be distributed over the plurality of processors and performed in parallel.

28. The system of claim 25, wherein the system can be incorporated into a circuit simulation environment.

29. The system of claim 28 wherein the tasks are simulation tasks to be performed on a circuit design.

30. The system of claim 29 wherein the tasks are one of characterization and verification tasks.

31. The system of claim 25 wherein the tasks are received from a user system.

32. The system of claim 31 further comprising a means for handshaking between the user's system and the system to prevent interactive use of the license pool.

33. A method for burst licensing of simulation tools in a circuit design and simulation environment, comprising the steps of:
receiving a request from a user to perform a set of simulation tasks with or upon a circuit design, wherein a burst license licenses a processor to perform a particular task;
checking-out one or more burst licenses from the pool and assigning said burst licenses to a matching number of processors;
using said burst licenses with said processors to perform the set of tasks in parallel; and, returning said burst licenses to the pool.

34. The method of claim 33 wherein the system includes a plurality of processors greater in number than the number of licenses in the license pool.

35. The method of claim 33 wherein the tasks can be distributed over the plurality of processors and performed in parallel.

36. The method of claim 33, wherein the system can be incorporated into a circuit simulation environment.

37. The method of claim 36 wherein the tasks are simulation tasks to be performed on a circuit design.

38. The method of claim 37 wherein the tasks are one of characterization and verification tasks.

39. The method of claim 33 wherein the tasks are received from a user system.

40. The method of claim 39 further comprising a means for handshaking between the user's system and the system to prevent interactive use of the license pool.

41. A system for burst licensing of simulation tools in a circuit design and simulation environment, including computer-readable instructions thereon, which when executed cause the system to perform the steps of:
receiving a request to perform-a-task from a user to perform a set of simulation tasks with or upon a circuit design, wherein a burst licenses a processor to perform a particular task;
checking-out or more burst licenses from the pool and assigning said burst licenses to a matching number of processors;
using said burst licenses with said processors to perform the set of tasks in parallel; and,
returning said burst licenses to the pool.

42. The system of claim 41 wherein the system includes a plurality of processors greater in number than the number of licenses in the license pool.

43. The system of claim 41 wherein the tasks can be distributed over the plurality of processors and performed in parallel.

44. The system of claim 41, wherein the system can be incorporated into a circuit simulation environment.

45. The system of claim 44 wherein the tasks are simulation tasks to be performed on a circuit design.

46. The system of claim 45 wherein the tasks are one of characterization and verification tasks.

47. The system of claim 41 wherein the tasks are received from a user system.

48. The system of claim 47 further comprising a means for handshaking between the user's system and the system to prevent interactive use of the license pool.

* * * * *

UNITED STATES PATENT AND TRADEMARK OFFICE
CERTIFICATE OF CORRECTION

| | |
|---|---|
| PATENT NO. | : 6,832,358 B2 |
| APPLICATION NO. | : 10/322854 |
| DATED | : December 14, 2004 |
| INVENTOR(S) | : Paul C. Foster |

It is certified that error appears in the above-identified patent and that said Letters Patent is hereby corrected as shown below:

Claim 16, Col. 9, line 1, delete "composing" and insert therefor --comprising--.

Claim 24, Col. 9, line 33, delete "users" and insert therfor --user's--.

Claim 41, Col. 10, line 36, delete "to perform-a-task".

Claim 41, Col. 10, line 38, delete "licenses" and insert therefor --license--.

Claim 41, Col. 10, line 40, after "checking-out" insert --one--.

Signed and Sealed this

Thirtieth Day of January, 2007

JON W. DUDAS
*Director of the United States Patent and Trademark Office*